(12) United States Patent
Sumi et al.

(10) Patent No.: US 12,390,868 B2
(45) Date of Patent: Aug. 19, 2025

(54) ELECTRIC WORKING MACHINE

(71) Applicant: Makita Corporation, Anjo (JP)

(72) Inventors: Takuya Sumi, Anjo (JP); Sho Tsuda, Anjo (JP); Koki Taniguchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 339 days.

(21) Appl. No.: 18/093,372

(22) Filed: Jan. 5, 2023

(65) Prior Publication Data

US 2023/0219151 A1 Jul. 13, 2023

(30) Foreign Application Priority Data

Jan. 7, 2022 (JP) ................................ 2022-001684

(51) Int. Cl.
| | | |
|---|---|---|
| *B23D 45/00* | (2006.01) | |
| *B23D 45/16* | (2006.01) | |
| *B23D 47/12* | (2006.01) | |
| *B25F 5/00* | (2006.01) | |
| *B28D 1/04* | (2006.01) | |

(52) U.S. Cl.
CPC ........... *B23D 45/003* (2013.01); *B23D 45/16* (2013.01); *B23D 47/12* (2013.01); *B25F 5/001* (2013.01); *B28D 1/045* (2013.01)

(58) Field of Classification Search
CPC ...... B23D 45/003; B23D 45/16; B23D 47/12; B25F 5/001; B28D 1/045
See application file for complete search history.

(56) References Cited

U.S. PATENT DOCUMENTS

| | | | | |
|---|---|---|---|---|
| 3,955,455 | A * | 5/1976 | Guzman | B23D 47/047 83/411.5 |
| 11,179,787 | B2 * | 11/2021 | Yoshida | H01M 50/267 |
| 2003/0037445 | A1 * | 2/2003 | Fey | B23D 47/126 30/388 |
| 2010/0218966 | A1 * | 9/2010 | Liebhard | A01G 3/053 318/722 |

(Continued)

FOREIGN PATENT DOCUMENTS

| | | |
|---|---|---|
| CN | 113784827 A | 12/2021 |
| JP | 2015-131370 A | 7/2015 |

(Continued)

OTHER PUBLICATIONS

Japanese Office Action dated Jul. 1, 2025 in Application No. 2022-001684.

*Primary Examiner* — Omar Flores Sanchez
(74) *Attorney, Agent, or Firm* — Sughrue Mion, PLLC

(57) ABSTRACT

An electric working machine may include an output shaft, a rotary blade attached to the output shaft, an output pulley fixed to the output shaft, an input shaft, an input pulley fixed to the input shaft, a transmission belt wrapped around the input pulley and the output pulley, an electric motor including a motor shaft and configured to rotate the motor shaft, a speed reducer configured to reduce a speed of rotation of the motor shaft and transmit the rotation to the input shaft, and a housing that houses the electric motor and the speed reducer, and rotatably supports the input shaft and the output shaft. A rotation axis of the motor shaft may be inclined with respect to a direction which is along a rotation axis of the output shaft.

10 Claims, 9 Drawing Sheets

(56) References Cited

U.S. PATENT DOCUMENTS

| | | | | |
|---|---|---|---|---|
| 2010/0299944 A1* | 12/2010 | Hellberg | .............. | B23D 45/003 |
| | | | | 30/388 |
| 2021/0094109 A1* | 4/2021 | Marinov | ................ | B23D 47/12 |
| 2021/0331260 A1* | 10/2021 | Li | ............................. | B25F 5/02 |
| 2021/0354219 A1* | 11/2021 | Fu | ......................... | B23D 47/12 |
| 2022/0097156 A1* | 3/2022 | Zheng | .................... | F04D 29/30 |
| 2023/0381875 A1* | 11/2023 | Li | ............................. | B25F 5/02 |
| 2023/0398614 A1* | 12/2023 | Vandenbush | .......... | B23D 59/02 |

FOREIGN PATENT DOCUMENTS

| | | |
|---|---|---|
| JP | 2016-043475 A | 4/2016 |
| WO | 2014/150859 A1 | 9/2014 |

* cited by examiner

ELECTRIC WORKING MACHINE

CROSS-REFERENCE TO RELATED APPLICATION

This application claims priority to Japanese Patent Application No. 2022-1684, filed on Jan. 7, 2022, the entire contents of which are incorporated herein by reference.

TECHNICAL FIELD

The technique disclosed herein relates to an electric working machine.

BACKGROUND

Japanese Patent Application Publication No. 2016-43475 describes an electric working machine including: an output shaft; a rotary blade attached to the output shaft; an output pulley fixed to the output shaft; an input shaft; an input pulley fixed to the input shaft; a transmission belt wrapped around the input pulley and the output pulley; an electric motor including a motor shaft and configured to rotate the motor shaft; a speed reducer configured to reduce a speed of rotation of the motor shaft and transmit the rotation to the input shaft; and a housing that houses the electric motor and the speed reducer, and rotatably supports the input shaft and the output shaft.

SUMMARY

In a conventional electric working machine, a rotation axis of a motor shaft is arranged along a rotation axis of an output shaft, as described in Japanese Patent Application Publication No. 2016-43475. In general, a longitudinal direction of an electric motor coincides with a direction of the rotation axis of the motor shaft, thus the longitudinal direction of the electric motor of the conventional electric working machine extends along the rotation axis of the output shaft. Due to this, it was impossible to downsize the electric working machine in the direction of the rotation axis of the output shaft (axial direction of a rotary blade). The present disclosure provides a technique which enables downsizing of an electric working machine in a direction of a rotation axis of an output shaft.

An electric working machine disclosed herein may comprise: an output shaft; a rotary blade attached to the output shaft; an output pulley fixed to the output shaft; an input shaft; an input pulley fixed to the input shaft; a transmission belt wrapped around the input pulley and the output pulley; an electric motor comprising a motor shaft and configured to rotate the motor shaft; a speed reducer configured to reduce a speed of a rotation of the motor shaft and transmit the rotation to the input shaft; and a housing that houses the electric motor and the speed reducer, and rotatably supports the input shaft and the output shaft. A rotation axis of the motor shaft may be inclined with respect to a direction which is along a rotation axis of the output shaft.

According to the above configuration, a longitudinal direction of the electric motor is inclined with respect to the direction which is along the rotation axis of the output shaft. Thus, the electric working machine can be downsized in the direction of the rotation axis of the output shaft.

DETAILED DESCRIPTION

Figure 1:
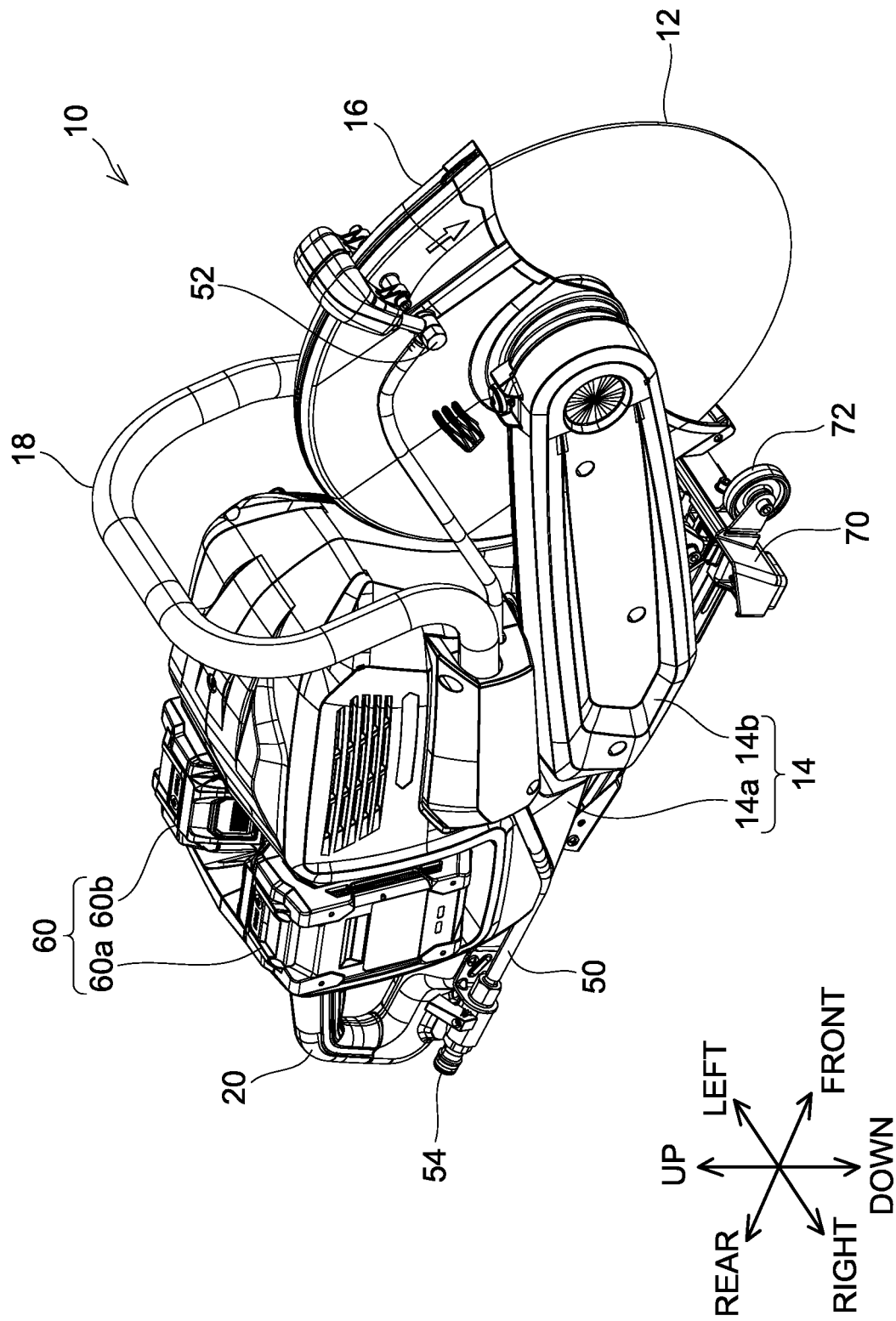
FIG. 1 is a perspective view of an entire power cutter 10 of an embodiment viewed from the front right upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric working machines as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the rotation axis of the motor shaft may be orthogonal to the direction which is along the rotation axis of the output shaft.

According to the above configuration, the longitudinal direction of the electric motor is substantially orthogonal to the rotation axis of the output shaft. Thus, the electric working machine can be downsized in the direction of the rotation axis of the output shaft (axial direction of the rotary blade).

In one or more embodiments, when the electric working machine is placed on a placement surface, the rotation axis of the output shaft may be arranged along a left-right direction in a vicinity of a front end of the housing, and the rotation axis of the motor shaft may be inclined at an angle within a range from −45° to 45° with respect to an up-down direction, in a side view of the electric working machine. In the present disclosure, an angle at which the rotation axis of the motor shaft is inclined with respect to the up-down direction will be explained describing the angle formed clockwise as a positive angle and the angle formed counterclockwise as a negative angle when the electric working machine is viewed from the right side.

According to the above configuration, in the state where the electric working machine is placed on the placement surface, the electric working machine can be downsized in the left-right direction and also in the front-rear direction.

In one or more embodiments, when the electric working machine is placed on the placement surface, the rotation axis of the motor shaft may be inclined with respect to the up-down direction such that the rotation axis of the motor shaft leans forward as it extends downward, in the side view of the electric working machine.

According to the above configuration, when a user uses the electric working machine with the rotary blade directed downward, the rotation axis of the motor shaft tends to be along the up-down direction. Consequently, the electric working machine can be downsized in the front-rear direction in the state where the user uses the electric working machine with the rotary blade directed downward. Accordingly, maneuverability for the user can be enhanced.

In one or more embodiments, in the side view of the electric working machine, the rotation axis of the motor shaft may be substantially orthogonal to a line passing through the rotation axis of the output shaft and the rotation axis of the input shaft.

According to the above configuration, the rotation axis of the motor shaft is substantially orthogonal to the radial direction of the rotary blade (i.e., substantially parallel to a tangential direction of the rotary blade). In other words, the longitudinal direction of the electric motor is substantially orthogonal to the radial direction of the rotary blade (i.e., substantially parallel to the tangential direction of the rotary blade). According to the above configuration, the electric working machine can be downsized in the radial direction of the rotary blade.

In one or more embodiments, the electric working machine may further comprise: a first handle disposed on the housing and configured to be grasped by a user with one hand; and a second handle disposed on the housing and configured to be grasped by the user with the other hand. When the electric working machine is placed on the placement surface, the first handle may be offset rearwardly from the rotary blade and forwardly from the electric motor, and the second handle may be offset rearwardly from the electric motor.

In general, maneuverability for the user increases as a position of the gravity center of the electric working machine is closer to a position of the gravity center of the user's body. Further, since the electric motor has a relatively large weight among components of the electric working machine, a position at which the electric motor is disposed greatly changes the position of the gravity center of the electric working machine. According to the above configuration, since the electric motor is disposed between the first handle and the second handle, the position of the gravity center of the electric working machine tends to be positioned close to the gravity center of the user's body when the user grasps the first handle and the second handle to use the electric working machine. Thus, maneuverability for the user can further be increased.

In one or more embodiments, the electric working machine may further comprise at least one battery pack configured to be attached to and detached from the housing and supply power to the electric motor.

When the electric working machine is driven using power from an external power source, it is necessary to attach a power cable to the electric working machine, which may decrease the maneuverability. According to the above configuration, it is not necessary to attach the power cable to the electric working machine, by which the maneuverability for the user can further be enhanced. Further, since it is possible to use the electric working machine even in a place where power cannot be externally supplied, user convenience can also be enhanced.

In one or more embodiments, when the electric working machine is placed on the placement surface, the at least one battery pack may be offset rearwardly from the electric motor and forwardly from the second handle.

Since the battery pack has a relatively large weight among the components of the electric working machine, a position at which the battery pack is disposed greatly changes the position of the gravity center of the electric working machine. According to the above configuration, since at least one of the battery packs is disposed between the first handle and the second handle, the position of the gravity center of the electric working machine tends to be positioned close to the gravity center of the user's body when the user grasps the first handle and the second handle to use the electric working machine. Thus, maneuverability for the user can further be increased.

In one or more embodiments, in a rear view of the electric working machine, when the electric working machine is placed on the placement surface, the at least one battery pack and the electric motor may at least partially overlap.

According to the above configuration, the electric motor and the at least one battery pack are disposed close to each other in the left-right direction and the up-down direction. According to the above configuration, in the state where the electric working machine is placed on the placement surface, the electric working machine can be downsized in the left-right direction and also in the up-down direction.

In one or more embodiments, when the electric working machine is placed on the placement surface, in a rear view of the electric working machine, the rotary blade and the electric motor may at least partially overlap.

According to the above configuration, the rotary blade and the electric motor are disposed close to each other in the left-right direction and the up-down direction. According to the above configuration, in the state where the electric working machine is placed on the placement surface, the electric working machine can be downsized in the left-right direction and also in the up-down direction.

In one or more embodiments, the output pulley includes a first rotation member and a second rotation member fixed adjacent to the first rotation member in the direction of the rotation axis of the output shaft. The first rotation member includes a first column portion around which the transmission belt is wrapped and a flange extending radially outward from an end of the first column portion on a side not adjacent to the second rotation member. The second rotation member includes a second column portion whose outer diameter is greater than the first column portion, and a base extending radially inward from an end of the second column portion on a side adjacent to the first rotation member. The second column portion includes a plurality of lock holes defined at a predetermined interval in a circumferential direction. The electric working machine includes a lock pin which is movably held by the housing and configured to be inserted into any one of the plurality of lock holes.

If a mechanism which suppresses the transmission belt from falling off from the output pulley and a mechanism to lock rotation of the output shaft are disposed in the output pulley, which is seamlessly and integrally formed, the output pulley would be formed into a complicated shape. Thus, when the electric working machine is assembled, attachment of the output pulley may be difficult. According to the above configuration, the output pulley is constituted of the first rotation member and the second rotation member. Thus, by separately attaching the first rotation member and the second rotation member at the time of assembly of the electric working machine, the output pulley can be easily attached. According to the above configuration, when the transmission belt wrapped around the first column portion moves in the direction of the rotation axis of the output shaft, the transmission belt abuts and is stopped by the flange of the first rotation member or the base of the second rotation member. Thus, the transmission belt is suppressed from falling off from the first column portion. Further, according to the above configuration, when the output pulley rotates with respect to the housing with the lock pin inserted into any one of the plurality of lock holes, the second rotation member abuts and is stopped by the lock pin. Thus, by inserting the lock pin into any one of the plurality of lock holes, the rotation of the output shaft can be locked.

In one or more embodiments, the first column portion and the flange are seamlessly and integrally formed. The second column portion and the base are seamlessly and integrally formed. Aluminum alloy is used for the first rotation member. Iron is used for the second rotation member.

Since the output pulley is a member which rotates with the output shaft, it is desirable to use a material having a small mass for the output pulley. On the other hand, given that the lock pin is inserted into the output pulley to lock the rotation of the output shaft, it is desirable to use a material having rigidity and high strength for the output pulley. According to the above configuration, it is possible to secure required rigidity and strength by using iron for the second rotation member to which the rock pin is inserted and also reduce the entire weight of the output pulley by using an aluminum alloy for the first rotation member around which the transmission belt is wrapped.

Embodiment (Configuration of Power Cutter 10)

As illustrated in FIG. 1, a power cutter 10 which is an example of an electric working machine is a handheld power tool and used to cut an object, mainly such as stone and iron. The power cutter 10 includes a rotary blade 12, a housing body 14a, a blade arm 14b, a blade cover 16, a front handle 18, a rear handle 20, a water supply hose 50, a right battery pack 60a, a left battery pack 60b and a guide roller 70. In the present disclosure, the right battery pack 60a and the left battery pack 60b may collectively be referred to as "a plurality of battery packs 60". Further, the housing body 14a and the blade arm 14b may collectively be referred to as "housing 14".

Figure 2:
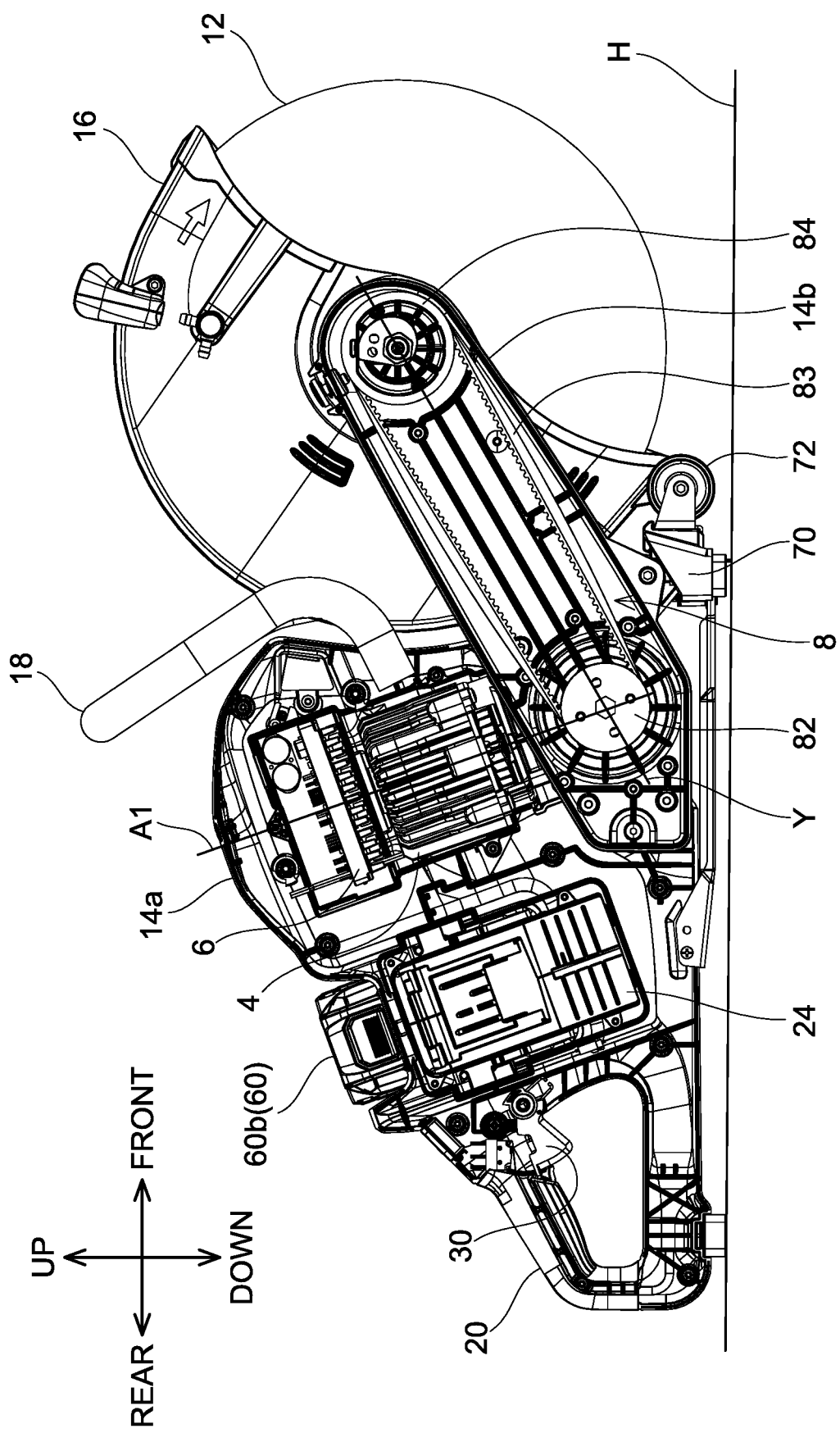
FIG. 2 is a side view of a structure of the power cutter 10 of the embodiment within a housing 14 viewed from the right side.

As illustrated in FIG. 2, the power cutter 10 further includes an electric motor 4, a control board 6, a battery interface 24 and a power transmission part 8.

(Rotary Blade 12)

The rotary blade 12 is a blade having a disk shape and it has a plurality of blade edges or grinding stones at its circumferential end. The rotary blade 12 may for example be a diamond wheel. The rotary blade 12 is a so-called consumable item, thus it is detachably attached to the blade arm 14b. A rotation axis of the rotary blade 12 extends in a direction orthogonal to the longitudinal direction of the blade arm 14b.

Here, in the present disclosure, in the state where the power cutter 10 is placed on the placement surface H, a direction orthogonal to the placement surface H is defined as an up-down direction, a direction toward the power cutter 10 from the placement surface H is defined as an upward direction, and a direction from the power cutter 10 toward the placement surface H is defined as a downward direction. Moreover, a direction orthogonal to the up-down direction and along which the rotation axis of the rotary blade 12 extends is defined as left-right direction. A direction perpendicular to the up-down direction and the left-right direction is defined as a front-rear direction, the direction extending from the rear handle 20 to the front handle 18 is defined as a frontward direction, and a direction extending from the front handle 18 to the rear handle 20 is defined as a rearward direction. Hereafter, it should be noted that explanations are given assuming that the power cutter 10 is placed on the placement surface H, unless otherwise indicated.

(Electric Motor 4)

Figure 3:
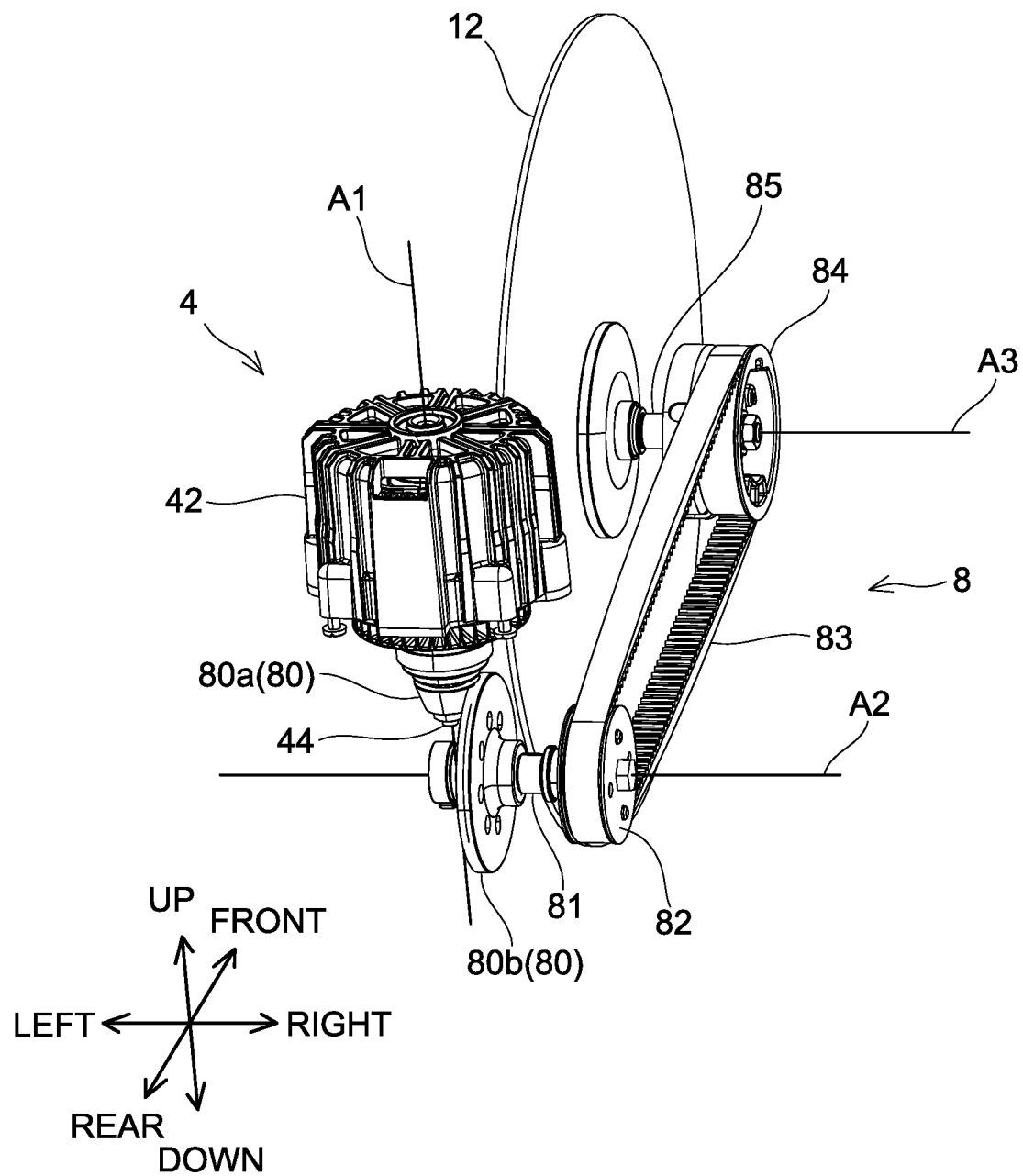
FIG. 3 is an electric motor 4, a power transmission part 8 and a rotary blade 12 arranged as illustrated in FIG. 2 in the power cutter 10 of the embodiment.

As illustrated in FIG. 3, the electric motor 4 includes a motor housing 42 and a motor shaft 44 configured to rotate about the rotation axis A1 with respect to a motor housing 42. The electric motor 4 of the present embodiment is a brushless motor, and a stator and a rotor (illustration omitted) are housed in the motor housing 42. A part of the motor shaft 44 is fixed to the rotor in the motor housing 42. A first gear 80a is fixed to the rest of the motor shaft 44. In the present embodiment, the first gear 80a is a bevel gear. When power is supplied to the electric motor 4, the motor shaft 44 starts to rotate about the rotation axis A1. The longitudinal direction of the electric motor 4 is coincident with the direction along which the rotation axis A1 extends.

As illustrated in FIG. 2, the electric motor 4 is housed in the housing body 14a. In the present embodiment, when the power cutter 10 is viewed from the right side, the rotation axis A1 of the motor shaft 44 (see FIG. 3) is inclined with respect to the up-down direction such that the rotation axis A1 of the motor shaft 44 leans forward as it extends downward. In the present embodiment, the angle at which the rotation axis A1 is inclined with respect to the up-down direction is −20°. When the power cutter 10 is viewed from the right side, the rotation axis A1 is substantially orthogonal to a line Y which passes through a rotation axis A2 of an input shaft 81 (see FIG. 3) and a rotation axis A3 of an output shaft 85 (see FIG. 3).

Figure 4:
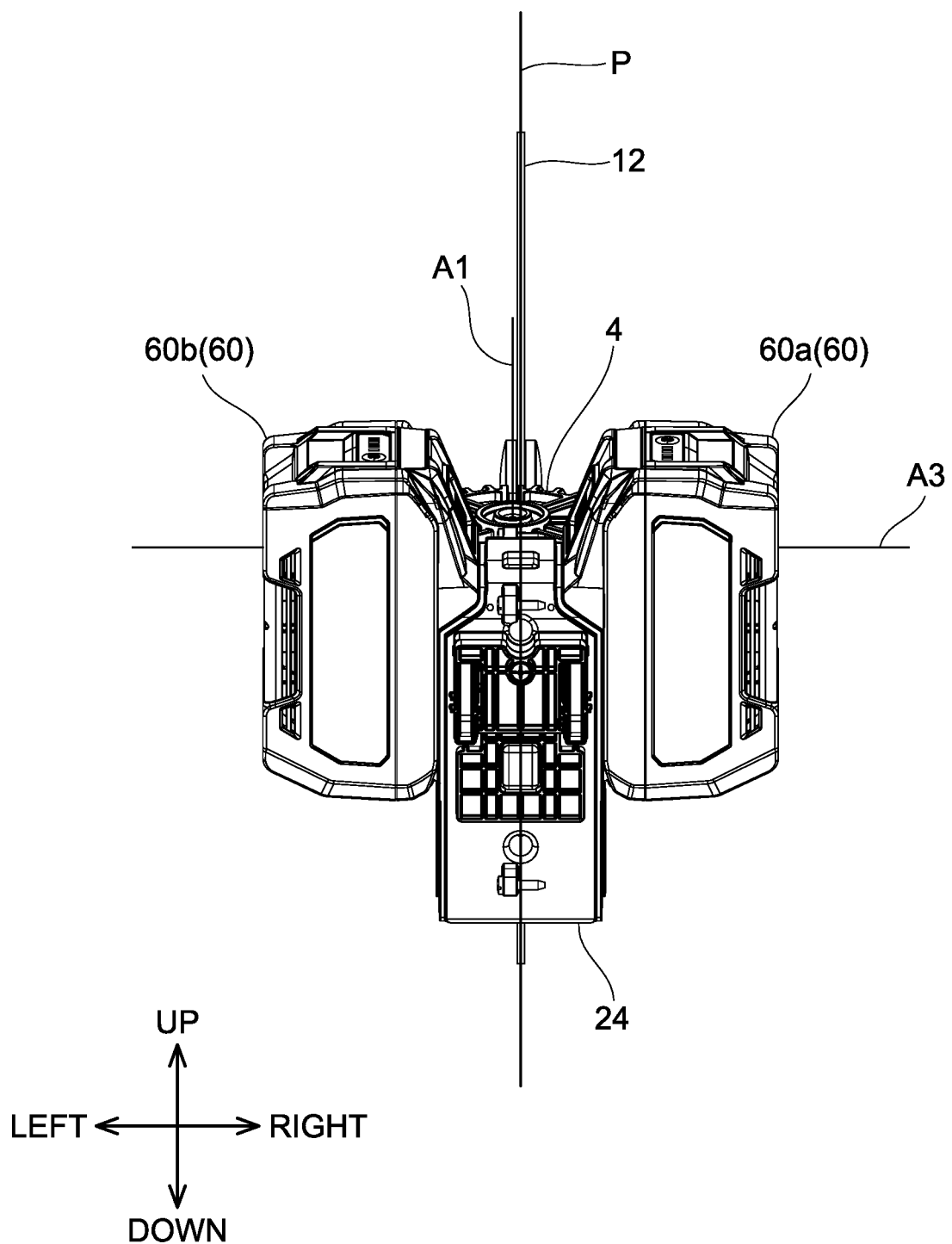
FIG. 4 is a view illustrating positional relationships between the electric motor 4, the rotary blade 12, a battery interface 24 and a plurality of battery packs 60 when the power cutter 10 of the embodiment is viewed from the rear side.

As illustrated in FIG. 4, in the rear view of the power cutter 10, the electric motor 4 partially overlaps with the rotary blade 12. The rotation axis A1 of the motor shaft 44 (see FIG. 3) of the electric motor 4 is orthogonal to the left-right direction. The rotation axis A1 of the motor shaft 44 is parallel to a reference plane P which is equivalent to a plane on which the rotary blade 12 extends. The reference plane P is a plane orthogonal to the rotation axis A3 (see FIG. 3) of the output shaft 85 to be described alter. The rotation axis A1 is disposed close to the reference plane P. In the present embodiment, a distance between the reference plane P and the rotation axis A1 is 3.5 mm.

(Power Transmission Part 8)

As illustrated in FIG. 3, the power transmission part 8 includes an input shaft 81, an output shaft 85, an input pulley 82 fixed to the input shaft 81, an output pulley 84 fixed to the output shaft 85, and a transmission belt 83 wrapped around the input pulley 82 and the output pulley 84.

The input shaft 81 and the input pulley 82 are rotatably supported about the rotation axis A2 by the housing 14 (illustration omitted). The rotation axis A2 of the input shaft 81 and the input pulley 82 is along the left-right direction. A second gear 80b is fixed to the input shaft 81 at a position offset leftward from the input pulley 82. In the present embodiment, the second gear 80b is a bevel gear. The second gear 80b is in mesh with the first gear 80a of the motor shaft 44. Since the first gear 80a and the second gear 80b are in mesh with each other, the input shaft 81 rotates simultaneously as the motor shaft 44 rotates. At this time, a speed of rotation of the input shaft 81 is reduced relative to a speed of rotation of the motor shaft 44 according to a gear ratio of the second gear 80b to the first gear 80a. In other words, the first gear 80a and the second gear 80b function not only as a mechanism which converts rotating movement of the motor shaft 44 about the rotation axis A1 into rotating movement of the input shaft 81 about the rotation axis A2 but also as a speed reducer. Therefore, in the present disclosure, the first gear 80a and the second gear 80b may collectively be referred to as "speed reducer 80".

As illustrated in FIG. 2, the transmission belt 83 is housed in the blade arm 14b together with the input pulley 82 and the output pulley 84. In the present embodiment, the input pulley 82 and the output pulley 84 are geared pulleys, and the transmission belt 83 is a geared belt. The input pulley 82 and the transmission belt 83 are in mesh with each other. The output pulley 84 and the transmission belt 83 are also in mesh with each other. Consequently, when the input shaft 81 rotates, the output pulley 84 rotates simultaneously via the transmission belt 83 and the input pulley 82 fixed to the input shaft 81. In the present embodiment, a pulley diameter of the output pulley 84 is greater than a pulley diameter of the input pulley 82. Thus, the speed of rotation of the output pulley 84 is reduced relative to the speed of rotation of the input pulley 82.

As illustrated in FIG. 3, the output pulley 84 and the output shaft 85 are rotatably supported about the rotation axis A3 by the housing 14 (not illustrated). The rotation axis A3 of the output pulley 84 and the output shaft 85 is along the left-right direction. The rotary blade 12 is attached to the output shaft 85 at a position offset leftward from the output pulley 84. Thus, when the output pulley 84 rotates, the rotary blade 12 also rotates simultaneously via the output shaft 85. In other words, the rotation axis A3 is an axis equivalent to a rotation axis of the rotary blade 12.

As described above, the power transmission part 8 transmits power from the electric motor 4 to the rotary blade 12. Consequently, the rotary blade 12 can be rotated by the electric motor 4 in the power cutter 10.

(Control Board 6)

As illustrated in FIG. 2, the control board 6 is housed in the housing body 14a. The control board 6 is disposed above the electric motor 4 in the direction along which the rotation axis A1 of the motor shaft 44 (see FIG. 3) extends. The control board 6 is disposed along the plane which is substantially orthogonal to the rotation axis A1 of the motor shaft 44. The control board 6 is electrically connected to the plurality of battery packs 60, and adjusts power supplied from the plurality of battery packs 60 and supplies the same to the electric motor 4. In the present embodiment, since the electric motor 4 is a brushless motor, the control board 6 further includes an inverter circuit (illustration omitted). The inverter circuit electrically connects the plurality of battery packs 60 to the electric motor 4, converts DC power from the plurality of battery packs 60 into three-phase AC power and supplies the same to the electric motor 4. The control board 6 is also electrically connected to lightings (not illustrated) of the housing 14, and can adjust the power supplied from the plurality of battery packs 60 and supply the same to the lightings.

(Plurality of Battery Packs 60 and Battery Interface 24)

The plurality of battery packs 60 includes at least one secondary battery cell (illustration omitted). The plurality of battery packs 60 is detachably attached to the battery interface 24 and can supply power to the electric motor 4. The battery interface 24 is arranged on the housing body 14a at a position offset rearwardly from the electric motor 4. The battery interface 24 is arranged on the housing body 14a such that the right battery pack 60a (see FIG. 1) and the left battery pack 60b are attached to the battery interface 24 with their longitudinal directions being substantially parallel to the direction which is along the rotation axis A1 of the motor shaft 44 (see FIG. 3). In other words, in the power cutter 10, the electric motor 4 and the plurality of battery packs 60 are disposed such that the respective longitudinal directions are substantially parallel.

As illustrated in FIG. 4, in the rear view of the power cutter 10, the battery interface 24 and the rotary blade 12 partially overlap. In the rear view of the power cutter 10, the right battery pack 60a and the left battery pack 60b attached to the battery interface 24 partially overlap the electric motor 4. The right battery pack 60a and the left battery pack 60b are symmetrical relative to the reference plane P which is equivalent to a plane on which the rotary blade 12 extends.

(Front Handle 18 and Rear Handle 20)

As illustrated in FIG. 1, the front handle 18 and the rear handle 20 are disposed on the housing body 14a. The front handle 18 extends rightward and leftward from above the housing body 14a. One end of the front handle 18 is attached to the vicinity of the center of the right side surface of the housing body 14a and the other end is attached to a lower portion of the left side surface of the housing body 14a. The rear handle 20 extends rearward from the housing body 14a.

As illustrated in FIG. 2, the front handle 18 is offset rearwardly from the rotary blade 12 and forwardly from the electric motor 4. The rear handle 20 is offset rearwardly from the battery interface 24. The user usually holds the power cutter 10 by grasping the front handle 18 with his/her left hand and grasps the rear handle 20 with his/her right hand. At this time, the user can adjust a posture of the power cutter 10 by changing a position at which the user grasps the front handle 18.

Figure 5:
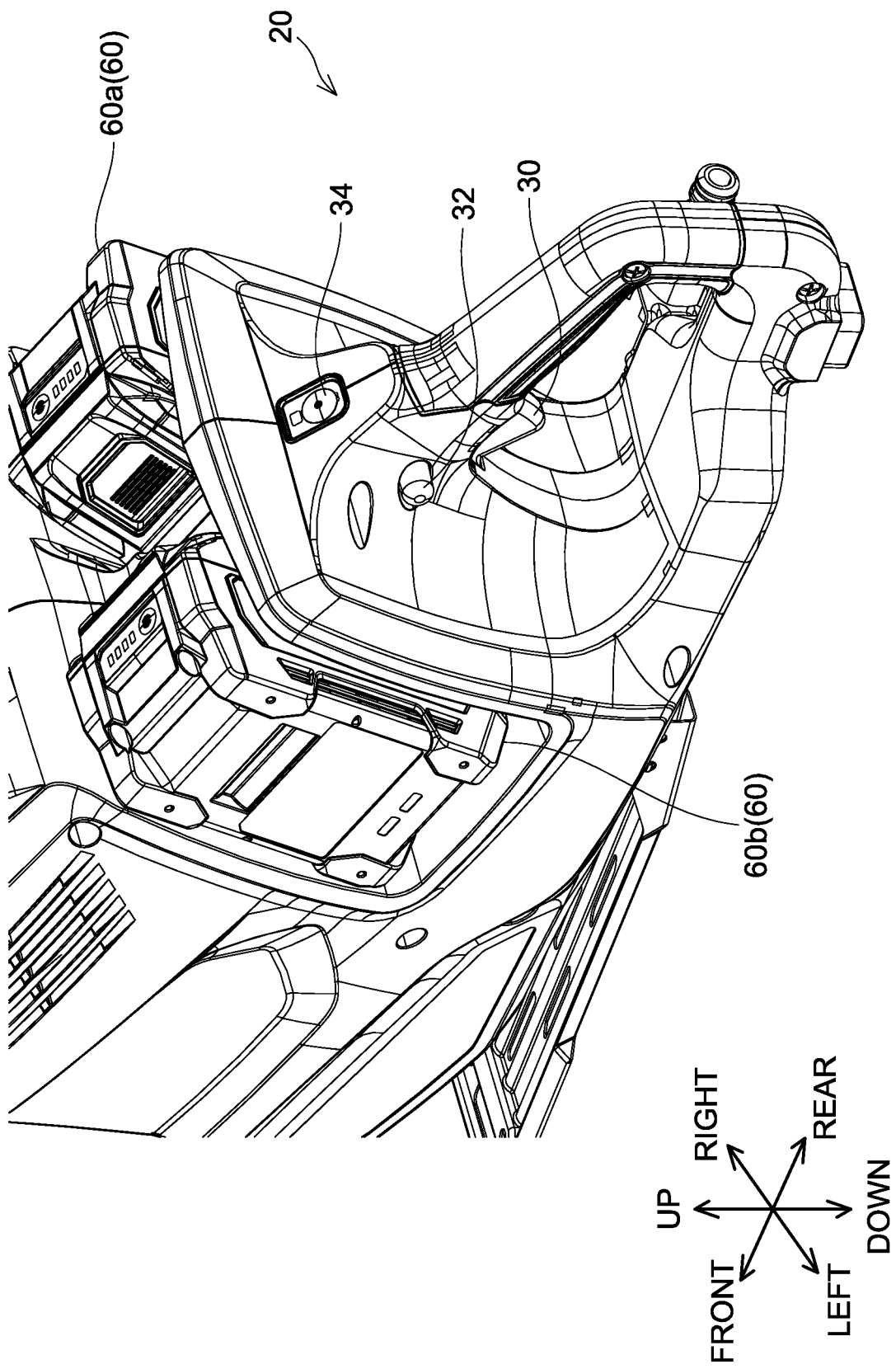
FIG. 5 is an enlarged view of a rear handle 20 included in the power cutter 10 of the embodiment viewed from the rear left upper side.

As illustrated in FIG. 5, the rear handle 20 includes a main switch 30 which the user can operate with his/her finger of the hand grasping the rear handle 20. In the present embodiment, when the user operates the main switch 30, the control board 6 (see FIG. 2) starts supplying power to the electric motor 4 and when the operation on the main switch 30 is stopped, the control board 6 stops supplying the power to the electric motor 4. In other words, the power cutter 10 is configured to rotate the rotary blade 12 only when the main switch 30 is being operated.

The rear handle 20 further includes a lock-off switch 32. The lock-off switch 32 is held such that it can slide in the left-right direction relative to the rear handle 20. Although not illustrated, when the lock-off switch 32 is not pushed rightward relative to the rear handle 20, the main switch 30 is in mechanical interference with the lock-off switch 32, by which operation on the main switch 30 is prohibited. When the lock-off switch 32 is pushed rightward relative to the rear handle 20, the main switch 30 is not in mechanical interference with the lock-off switch 32, by which operation on the main switch 30 is allowed.

The rear handle 20 further includes an operation button 34. In the present embodiment, the control board 6 (see FIG. 2) starts or stops the supply of power to lightings (not illustrated) in accordance with operation on the operation button 34. In other words, the operation button 34 is a button to switch the lightings on and off (Blade Cover 16)

As illustrated in FIG. 1, the blade cover 16 is attached to the vicinity of the front end of the blade arm 14b and covers a part of the rotary blade 12. The blade cover 16 suppresses cutting dust generated by the rotary blade 12 from flying toward the user. The blade cover 16 of the present embodiment is configured to circumferentially cover a part of the rotary blade 12 (e.g., an angular area of 175° or more). At least a part of the blade cover 16 may be movable relative to the blade arm 14b.

(Water Supply Hose 50)

The water supply hose 50 is disposed at the right side of the power cutter 10. The distal end of the water supply hose 50 is attached to the outer side surface of the blade cover 16 via the plug 52. The proximal end of the water supply hose 50 is attached to a lower portion of the rear handle 20. A water supply connector 54 is disposed at the proximal end of the water supply hose 50. The water supply connector 54 is held by the housing body 14a, and can be connected to an external water source such as a tap faucet via a hose (illustration omitted). Thus, the water supply hose 50 can supply water into the blade cover 16.

(Guide Roller 70)

As illustrated in FIG. 2, the guide roller 70 is attached to a lower portion of the housing 14. The guide roller 70 includes a pair of left and right wheels 72 (see FIG. 1, FIG. 6). In the state where the power cutter 10 is placed on the placement surface H, the pair of left and right wheels 72 is arranged such that the wheels 72 are not in contact with the placement surface H. The user who uses the power cutter 10 can stably move the rotary blade 12 forward and rearward relative to an object to be cut by performing work with the pair of left and right wheels 72 being in contact with a plane (e.g., the placement surface H).

(Position of Gravity Center GT of Power Cutter 10)

Figure 6:
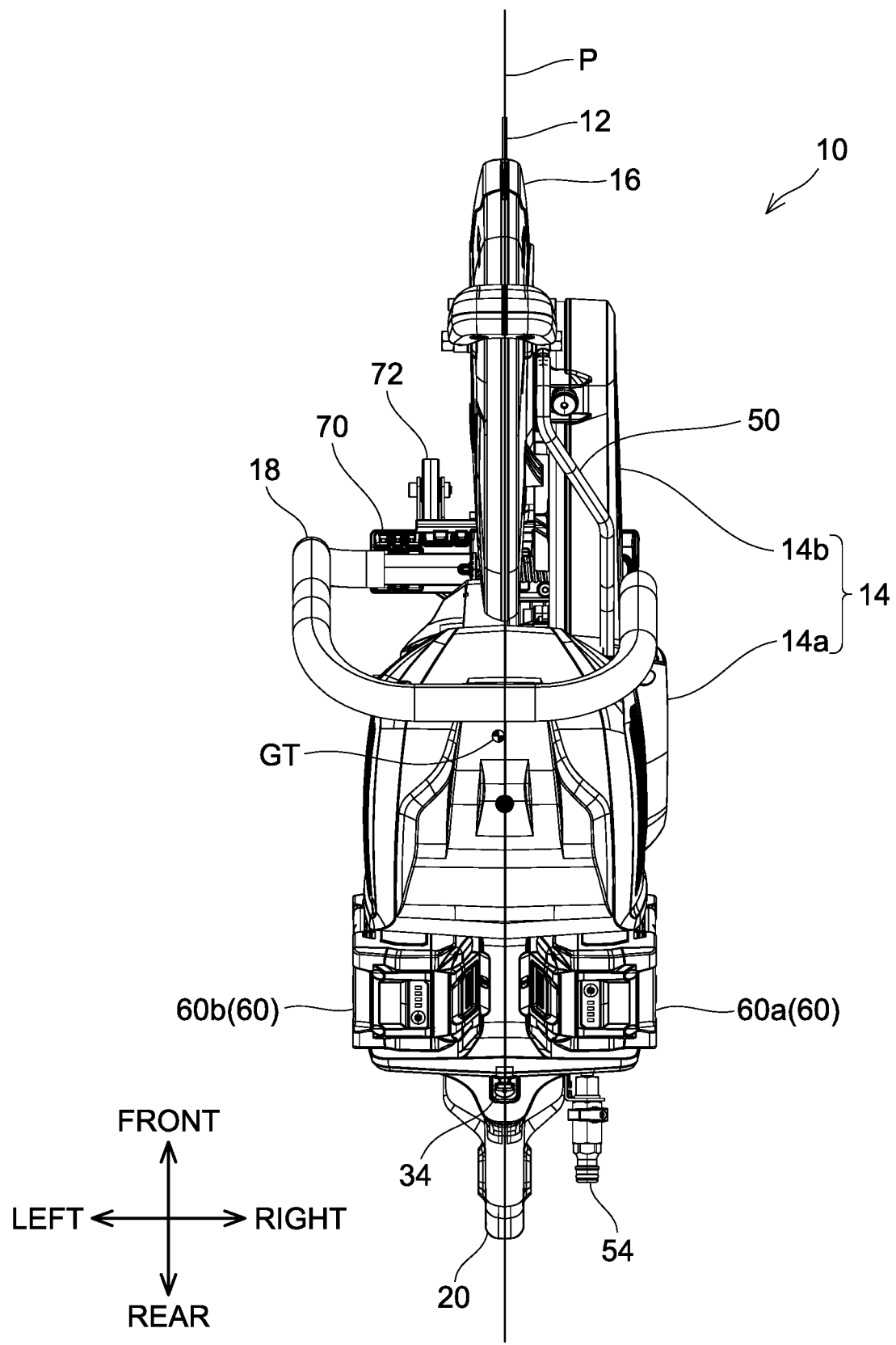
FIG. 6 is a top view illustrating a position of the gravity center GT of the power cutter 10 of the embodiment.

As illustrated in FIG. 6, the position of gravity center GT of the power cutter 10 of the present embodiment which is configured as described above is positioned between the front handle 18 and the rear handle 20, in the vicinity of the reference plane P. Consequently, when the user holds the power cutter 10 by grasping the front handle 18 with his/her left hand and the rear handle 20 with his/her right hand, a posture of the power cutter 10 tends to be stabilized.

(Lock Mechanism of Output Shaft 85 and Fall-Out Suppression Mechanism of Transmission Belt 83)

Figure 7:
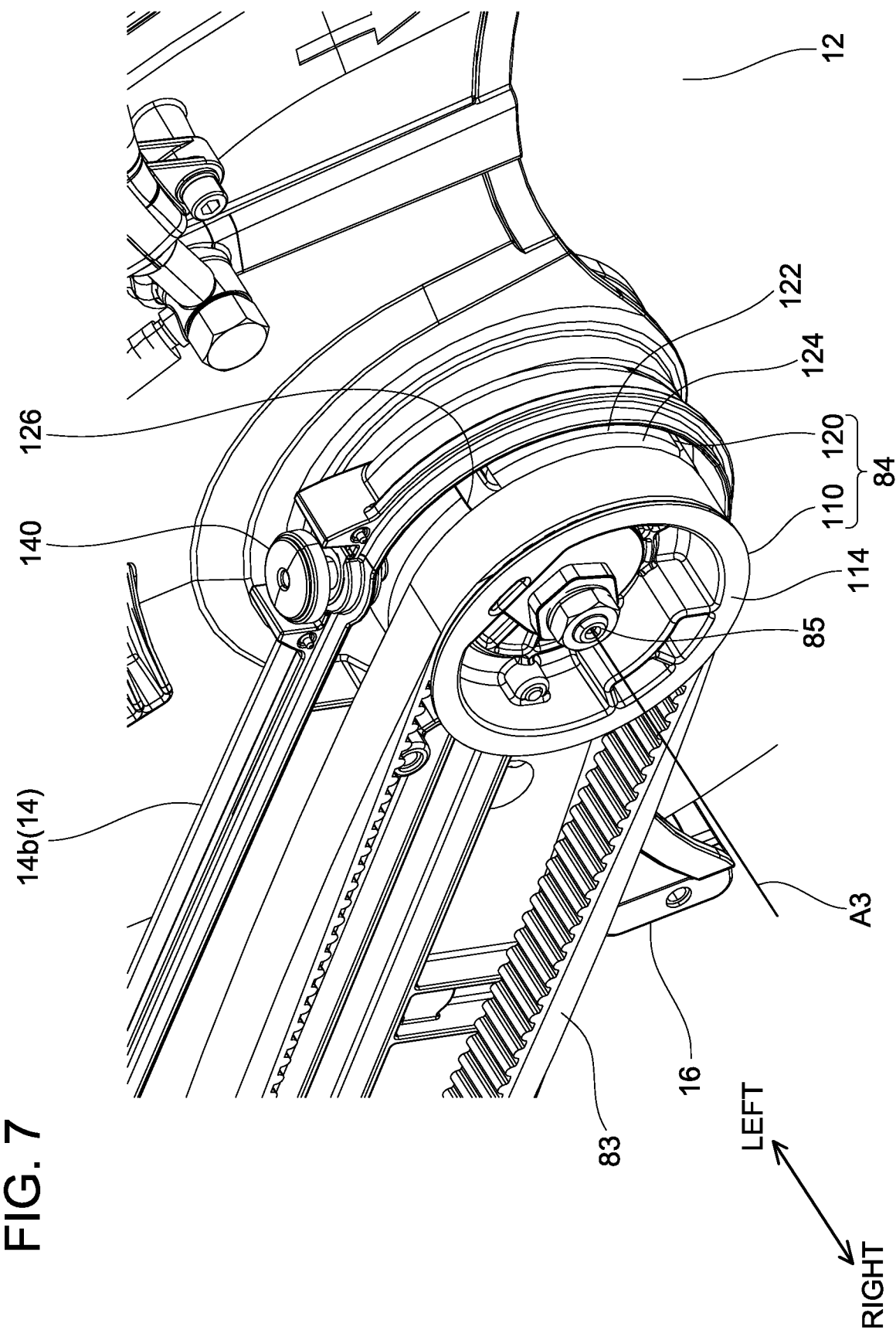
FIG. 7 is an enlarged view illustrating a fall-out suppression mechanism of a transmission belt 83 of the power cutter 10 of the embodiment and the state in which rotation of an output shaft 85 is allowed at a lock mechanism of the output shaft 85.

As illustrated in FIG. 7, a lock pin 140 is disposed at the blade arm 14b of the present embodiment. The lock pin 140 is held such that it can slide with respect to the blade arm 14b in a direction substantially orthogonal to the rotation axis A3 of the output shaft 85. The lock pin 140 is biased toward the outside of the blade arm 14b by a coil spring (illustration omitted).

The output pulley 84 of the present embodiment includes a first rotation member 110 around which the transmission belt 83 is wrapped and a second rotation member 120 into which the lock pin 140 is inserted. The first rotation member 110 is fixed to the output shaft 85. The details will be described later, however, the second rotation member 120 is fixed to the first rotation member 110. In other words, the first rotation member 110 and the second rotation member 120 are members which rotate about the rotation axis A3 along with the output shaft 85.

Figure 8:
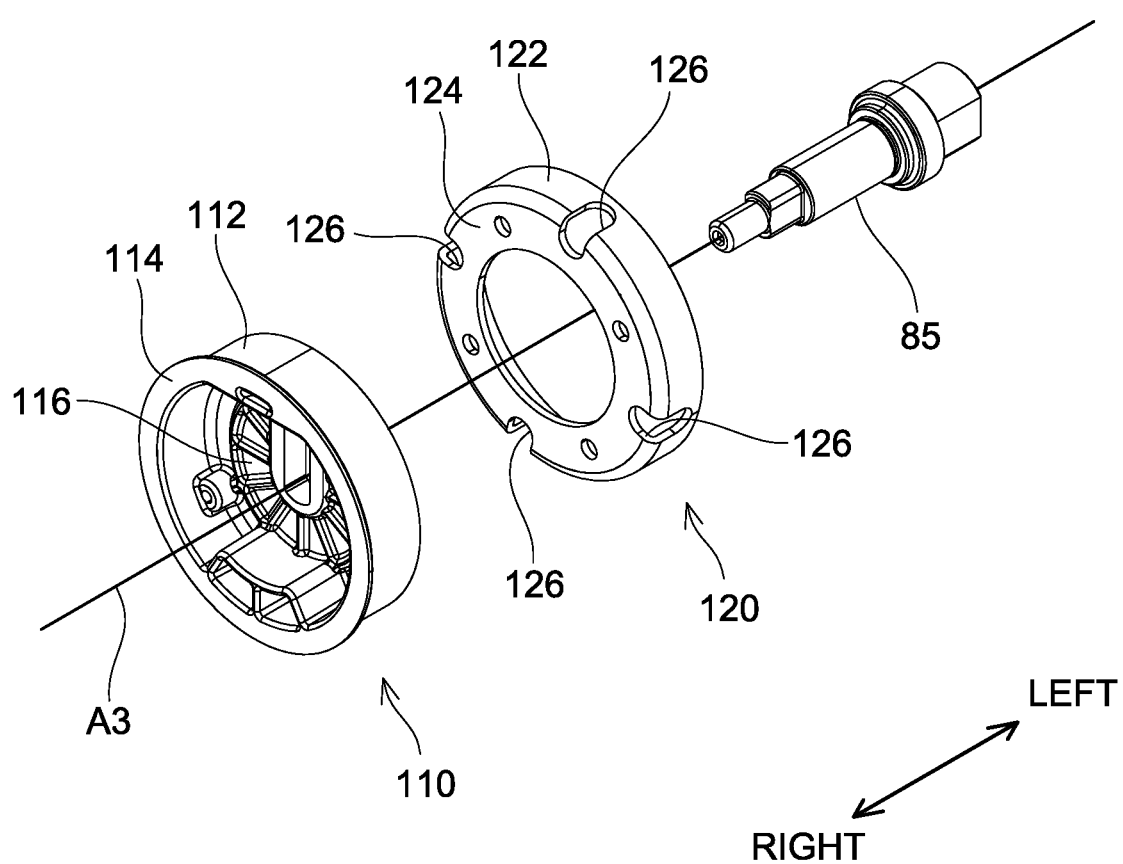
FIG. 8 is a disassembled view of an output pulley 84 included in the power cutter 10 of the embodiment.

As illustrated in FIG. 8, the first rotation member 110 includes a first column portion 112, a flange 114 extending radially outward from the right end of the first column portion 112 and a first base 116 extending radially inward from the left end from the first column portion 112. In the present embodiment, a plurality of gears is formed on the first column portion 112 at a predetermined interval in the circumferential direction, and is in mesh with the plurality of gears formed on the transmission belt 83 (see FIG. 7). The transmission belt 83 is wrapped around the first column portion 112. The first column portion 112, the flange 114 and the first base 116 are seamlessly and integrally formed. In the present embodiment, an aluminum alloy is used for the first rotation member 110.

The second rotation member 120 includes a second column portion 122 and a second base 124 extending radially inward from the right end of the second column portion 122. The second column portion 122 includes a plurality of lock holes 126 defined at a predetermined interval in the circumferential direction. In the present embodiment, the plurality of lock holes 126 is four lock holes, and they are defined every ¼ rotation in the circumferential direction of the second column portion 122. An outer diameter of the second column portion 122 is greater than an outer diameter of the first column portion 112. The second base 124 is fixed to the first base 116 of the first rotation member 110 by screw(s) (illustration omitted). The second column portion 122 and the second base 124 are seamlessly and integrally formed. In the present embodiment, iron is used for the second rotation member 120.

Figure 9:
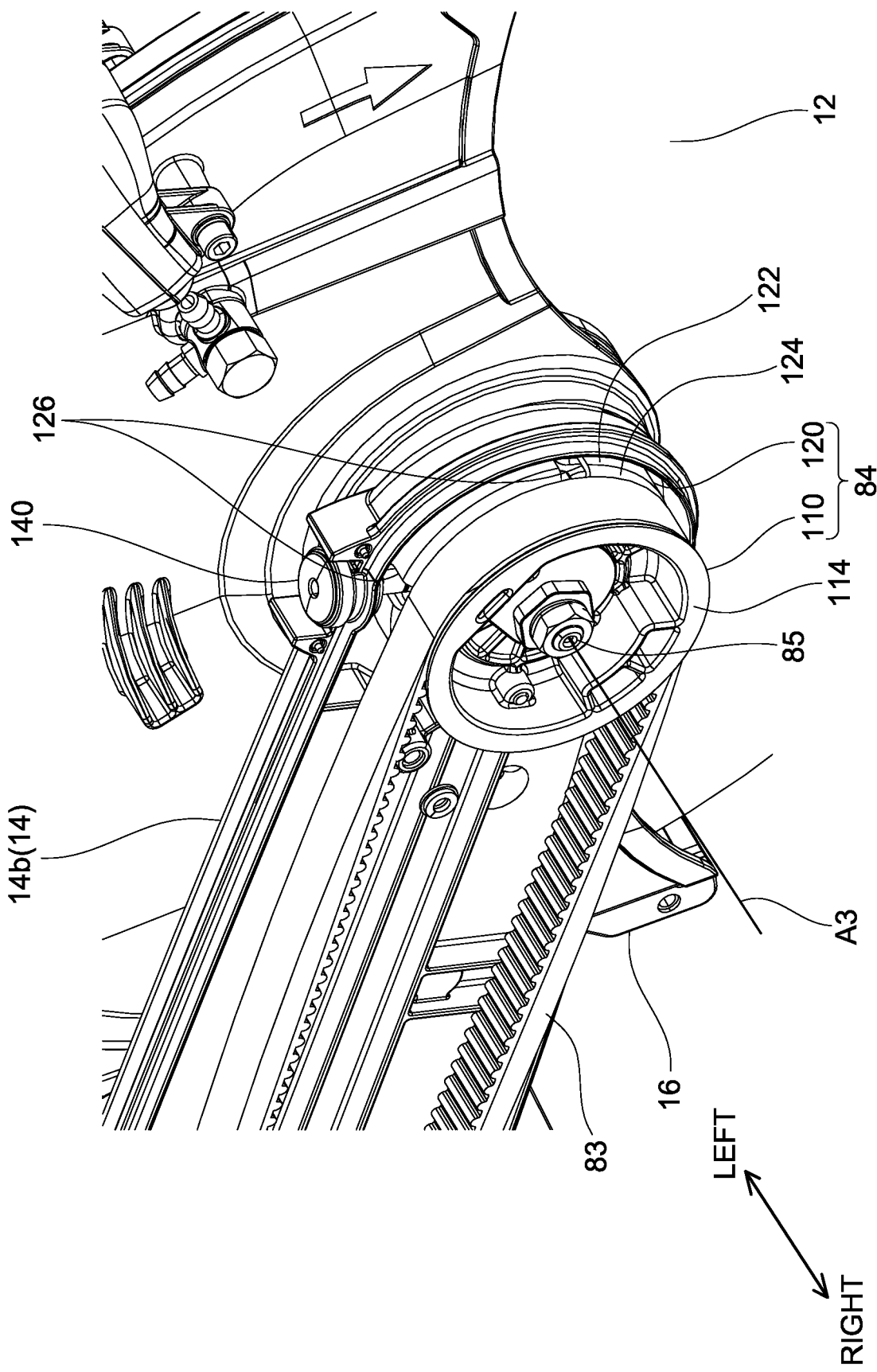
FIG. 9 is an enlarged view illustrating the fall-out suppression mechanism of the transmission belt 83 of the power cutter 10 of the embodiment and the state in which rotation of the output shaft 85 is prohibited at the lock mechanism of the output shaft 85.

As illustrated in FIG. 9, when the lock pin 140 is pushed against biasing force of the coil spring in the state in which the output shaft 85 is rotated and any one of the plurality of lock holes 126 is positioned in the slide direction of the lock pin 140, the lock pin 140 is inserted into the lock hole 126. In the state where the lock pin 140 is inserted into the lock hole 126, the lock pin 140 and the lock hole 126 are in mechanical interference with each other, by which rotation of the output shaft 85 about the rotation axis A3 is prohibited. On the other hand, as illustrated in FIG. 7, in the state where the lock pin 140 is not inserted into the lock hole 126, the lock pin 140 and the lock hole 126 are not in mechanical interference with each other, by which the rotation of the output shaft 85 about the rotation axis A3 is allowed.

When the transmission belt 83 wrapped around the first column portion 112 moves rightward in a direction of the rotation axis A3 of the output shaft 85, the transmission belt 83 abuts and is stopped by the flange 114 on the right side of the transmission belt 83. When the transmission belt 83 moves leftward in the direction of the rotation axis A3, the transmission belt 83 abuts and is stopped by the second base 124 on the left side of the transmission belt 83. Consequently, the transmission belt 83 is suppressed from falling out from the output pulley 84.

(Variants)

In the above embodiment, the power cutter 10 was described as an example of an electric working machine. In another embodiment, the electric working machine may be an electric working machine other than the power cutter 10, such as an electric circular saw or a grinder.

In the above embodiment, the configuration in which the electric motor 4 is a brushless motor was described. In another embodiment, the electric motor 4 may be a motor other than a brushless motor. For example, the electric motor 4 may be a brushed motor.

In the above embodiments, the configuration in which, when the power cutter 10 is viewed from the right side, the rotation axis A1 of the motor shaft 44 is inclined with respect to the up-down direction such that the rotation axis leans forward as it extends downward and the angle at which the rotation axis A1 is inclined with respect to the up-down direction is −20° was described. In another embodiment, when the power cutter 10 is viewed from the right side, the angle at which the rotation axis A1 in inclined with respect to the up-down direction may not be −20°. In this case, the angle at which the rotation axis A1 is inclined with respect to the up-down direction may be suitably changed within a range from −45° to 45°. In yet another embodiment, when the power cutter 10 is viewed from the right side, the angle at which the rotation axis A1 is inclined with respect to the up-down direction may not be within a range from −45° to 45°.

In the above embodiment, the configuration in which, when the power cutter 10 is viewed from the right side, the rotation axis A1 is substantially orthogonal to the line Y passing through the rotation axis A2 of the input pulley 82 and the rotation axis A3 of the output pulley 84 was described. In another embodiment, when the power cutter 10 is viewed from the right side, the rotation axis A1 may not be substantially orthogonal to the line Y passing through the rotation axis A2 and the rotation axis A3.

In the above embodiment, the configuration in which the first gear 80a and the second gear 80b are bevel gears was described. In another embodiment, the first gear 80a and the second gear 80b may be gears other than bevel gears. For example, the first gear 80a and the second gear 80b may be worm gears.

In the above embodiment, the configuration in which the input pulley 82 and the output pulley 84 are geared pulleys, the transmission belt 83 is a geared belt, and power is transmitted between the input pulley 82, the transmission belt 83 and the output pulley 84 mainly by meshing of the respective gears was described. In another embodiment, the input pulley 82 and the output pulley 84 may be pulleys other than geared pulleys, and the transmission belt 83 may be a belt other than a geared belt. For example, the input pulley 82 and the output pulley 84 may be pulleys including V-shaped grooves, and the transmission belt 83 may be a flat belt or a V belt. In this case, power is transmitted between the input pulley 82, the transmission belt 83 and the output pulley 84 mainly by friction between these members.

In the above embodiment, the configuration in which the pulley diameter of the output pulley 84 is greater than the pulley diameter of the input pulley 82 was described. In another embodiment, the pulley diameter of the output pulley 84 may be the same as the pulley diameter of the input pulley 82 or may be smaller than the pulley diameter of the input pulley 82.

In the above embodiment, the configuration in which the electric working machine (the power cutter 10) includes the plurality of battery packs 60 and power is supplied from the plurality of battery packs 60 to the electric motor 4 was described. In another embodiment, the electric working machine (the power cutter 10) may include a power cable connected to an external power source instead of the plurality of battery packs 60, and power may be supplied from the external power source to the electric motor 4 via the power cable. In yet another embodiment, the electric working machine (the power cutter 10) may include one battery pack instead of the plurality of battery packs 60.

In the above embodiment, the configuration in which the plurality of battery packs 60 is two battery packs (the right battery pack 60a and the left battery pack 60b) was described. In another embodiment, the plurality of battery packs 60 may be three or more battery packs. For example, the plurality of battery packs 60 may be four battery packs.

Unlike the above embodiment, the power cutter 10 may further include a battery pack cover which covers the plurality of battery packs 60 and is configured to open and close. In this case, it is possible to protect the plurality of battery packs 60 from moisture and cutting dust.

In the above embodiment, the configuration in which the front handle 18 is offset rearwardly from the rotary blade 12 and forwardly from the electric motor 4 and the rear handle 20 is offset rearwardly from the battery interface 24 was described. In another embodiment, the front handle 18 and the rear handle 20 may be disposed at any positions as long as the front handle 18 is offset forwardly from the rear handle 20.

Unlike the above embodiment, the power cutter 10 may further include a water supply tank connected to the water supply connector 54. In this case, it is not necessary to attach a hose or the like to the water supply connector 54 to connect with an external water source, thus maneuverability for the user can further be enhanced. Moreover, it is possible to use the power cutter 10 even in a place where water cannot be supplied externally, thus user convenience can also be enhanced.

In the above embodiment, the configuration in which an aluminum alloy is used for the first rotation member 110 and iron is used for the second rotation member 120 was described. In another embodiment, a material other than an aluminum alloy may be used for the first rotation member 110 and a material other than iron may be used for the second rotation member 120. For example, resin may be used for the first rotation member 110 and an aluminum alloy may be used for the second rotation member 120.

In the above embodiment, the configuration in which the plurality of lock holes 126 is four lock holes and they are defined every ¼ rotation in the circumferential direction of the second column portion 122 was described. In another embodiment, the four lock holes may be defined at an interval shorter than every ¼ rotation in the circumferential direction of the second column portion 122. In yet another embodiment, the plurality of lock holes 126 may be two, three, five, or more lock holes.

(Corresponding Relationships)

As described above, in one or more embodiments, the power cutter 10 (an example of the electric working machine) comprises: the output shaft 85; the rotary blade 12 attached to the output shaft 85; the output pulley 84 fixed to the output shaft 85; the input shaft 81; the input pulley 82 fixed to the input shaft 81; the transmission belt 83 wrapped around the input pulley 82 and the output pulley 84; the electric motor 4 comprising the motor shaft 44 and configured to rotate the motor shaft 44; the speed reducer 80 configured to reduce the speed of the rotation of the motor shaft 44 and transmit the rotation to the input shaft 81; and the housing 14 that houses the electric motor 4 and the speed reducer 80, and rotatably supports the input shaft 81 and the output shaft 85. The rotation axis A1 of the motor shaft 44 is substantially orthogonal to (an example of being inclined with respect to) the left-right direction which is along the rotation axis A3 of the output shaft 85.

According to the above configuration, the longitudinal direction of the electric motor 4 is inclined with respect to the left-right direction which is along the rotation axis A3 of the output shaft 85. Consequently, the power cutter 10 can be downsized in the direction of the rotation axis A3 of the output shaft 85.

In one or more embodiments, the rotation axis A1 of the motor shaft 44 is orthogonal to the left-right direction which is along the rotation axis A3 of the output shaft 85.

According to the above configuration, the longitudinal direction of the electric motor 4 is substantially orthogonal to the rotation axis A3 of the output shaft 85. Consequently, the power cutter 10 can further be downsized in the direction of the rotation axis A3 of the output shaft 85.

In one or more embodiments, when the power cutter 10 is placed on the placement surface H, the rotation axis A3 of the output shaft 85 is arranged along the left-right direction in the vicinity of the front end of the housing 14, and in the side view of the power cutter 10, the rotation axis A1 of the motor shaft 44 is inclined at an angle within a range from −45° to 45° with respect to the up-down direction.

According to the above configuration, in the state where the power cutter 10 is placed on the placement surface H, the power cutter 10 can be downsized in the left-right direction and also in the front-rear direction.

In one or more embodiments, when the power cutter 10 is placed on the placement surface H, in the side view of the power cutter 10, the rotation axis A1 of the motor shaft 44 is inclined with respect to the up-down direction such that the rotation axis A1 leans forward as it extends downward.

According to the above configuration, when the user uses the power cutter 10 with the rotary blade 12 directed downward, the rotation axis A1 of the motor shaft 44 tends to be positioned along the up-down direction. Consequently, the power cutter 10 can be downsized in the front-rear direction in the state in which the user uses the power cutter 10 with the rotary blade 12 directed downward. Accordingly, maneuverability for the user can be enhanced.

In one or more embodiments, in the side view of the power cutter 10, the rotation axis A1 of the motor shaft 44 is substantially orthogonal to the line Y passing through the rotation axis A3 of the output shaft 85 and the rotation axis A2 of the input shaft 81.

According to the above configuration, the rotation axis A1 of the motor shaft 44 is substantially orthogonal to the radial direction of the rotary blade 12 (i.e., substantially parallel to a tangential direction of the rotary blade 12). In other words, the longitudinal direction of the electric motor 4 is substantially orthogonal to the radial direction of the rotary blade 12 (i.e., substantially parallel to the tangential direction of the rotary blade 12). According to the above configuration, the power cutter 10 can be downsized in the radial direction of the rotary blade 12.

In one or more embodiments, the power cutter 10 further comprises: the front handle 18 (an example of the first handle) disposed on the housing 14 and configured to be grasped by the user with his/her left hand (an example of one hand); and the rear handle 20 (an example of the second handle) disposed on the housing 14 and configured to be grasped by the user with his/her right hand (an example of the other hand). When the power cutter 10 is placed on the placement surface H, the front handle 18 is offset rearwardly from the rotary blade 12 and forwardly from the electric motor 4, and the rear handle 20 is offset rearwardly from the electric motor 4.

In general, maneuverability for the user increases as the position of the gravity center GT of the power cutter 10 is closer to the gravity center of the user's body. Further, since the electric motor 4 has a relatively large weight among the components of the power cutter 10, a position at which the electric motor 4 is disposed greatly changes the position of the gravity center GT of the power cutter 10. According to the above configuration, since the electric motor 4 is disposed between the front handle 18 and the rear handle 20, the position of the gravity center GT of the power cutter 10 tends to be positioned close to the gravity center of the user's body when the user grasps the front handle 18 and the rear handle 20 to use the power cutter 10. Thus, maneuverability for the user can further be increased.

In one or more embodiments, the power cutter 10 further comprises the plurality of battery packs 60 (an example of at least one battery pack) configured to be attached to and detached from the housing 14 and supply power to the electric motor 4.

When the power cutter 10 is driven using power from an external power source, it is necessary to attach a power cable to the power cutter 10, which may decrease the maneuverability. According to the above configuration, it is not necessary to attach the power cable to the power cutter 10, by which the maneuverability for the user can further be enhanced. Further, since it is possible to use the power cutter 10 even in a place where power cannot be externally supplied, user convenience can also be enhanced.

In one or more embodiments, when the power cutter 10 is placed on the placement surface H, the plurality of battery packs 60 is offset rearwardly from the electric motor 4 and forwardly from the rear handle 20.

Since the plurality of battery packs 60 has a relatively large weight among the components of the power cutter 10, a position at which the plurality of battery packs 60 is disposed greatly changes the position of the gravity center GT of the power cutter 10. According to the above configuration, since the plurality of battery packs 60 is disposed between the front handle 18 and the rear handle 20, the position of the gravity center GT of the power cutter 10 tends to be positioned close to the gravity center of the user's body when the user grasps the front handle 18 and the rear handle 20 to user the power cutter 10. Thus, maneuverability for the user can further be increased.

In one or more embodiments, when the power cutter 10 is placed on the placement surface H, in the rear view of the power cutter 10, the plurality of battery packs 60 and the electric motor 4 at least partially overlap.

According to the above configuration, the electric motor 4 and the plurality of battery packs 60 are disposed close to each other in the left-right direction and the up-down direction. According to the above configuration, with respect to the state in which the power cutter 10 is placed on the placement surface H, the power cutter 10 can be downsized in the left-right direction and also in the up-down direction.

In one or more embodiments, when the power cutter 10 is placed on the placement surface H, in the rear view of the power cutter 10, the rotary blade 12 and the electric motor 4 at least partially overlap.

According to the above configuration, the rotary blade 12 and the electric motor 4 are disposed close to each other in the left-right direction and the up-down direction. According to the above configuration, in the state where the power cutter 10 is placed on the placement surface H, the power cutter 10 can be downsized in the left-right direction and also in the up-down direction.

In one or more embodiments, the output pulley 84 includes the first rotation member 110 and the second rotation member 120 fixed adjacent to the first rotation member 110 in the direction of the rotation axis A3 of the output shaft 85. The first rotation member 110 includes the first column portion 112 around which the transmission belt 83 is wrapped and the flange 114 extending radially outward from the right end of the first column portion 112 (an example of the end on the side not adjacent to the second rotation member). The second rotation member 120 includes the second column portion 122 whose outer diameter is greater than the first column portion 112, and the second base 124 (an example of the base) extending radially inward from the right end of the second column portion 122 (an example of the end on the side adjacent to the first rotation member). The second column portion 122 includes the plurality of lock holes 126 defined at a predetermined interval in the circumferential direction. The power cutter 10 further includes the lock pin 140 which is movably held by the housing 14 and configured to be inserted into any one of the plurality of lock holes 126.

If a mechanism which suppresses the transmission belt 83 from falling off from the output pulley and a mechanism to lock the rotation of the output shaft 85 are disposed at the output pulley which is seamlessly and integrally formed, the output pulley may be formed into a complicated shape. Thus, when the power cutter 10 is assembled, attachment of output pulley may be difficult. According to the above configuration, the output pulley 84 is constituted of the first rotation member 110 and the second rotation member 120. Thus, by separately attaching the first rotation member 110 and the second rotation member 120 at the time of assembly of the power cutter 10, the output pulley 84 can be easily attached. According to the above configuration, when the transmission belt 83 wrapped around the first column portion 112 moves in the direction of the rotation axis A3 of the output shaft 85, the transmission belt 83 abuts and is stopped by the flange 114 of the first rotation member 110 or the second base 124 of the second rotation member 120. Thus, the transmission belt 83 is suppressed from falling off from the first column portion 112. Further, according to the above configuration, when the output pulley 84 rotates with respect to the housing 14 with the lock pin 140 inserted into any one of the plurality of lock holes 126, the second rotation member 120 abuts and is stopped by the lock pin 140. Thus, by inserting the lock pin 140 into any one of the plurality of lock holes 126, the rotation of the output shaft 85 can be locked.

In one or more embodiments, the first column portion 112 and the flange 114 are seamlessly and integrally formed. The second column portion 122 and the second base 124 are seamlessly and integrally formed. An aluminum alloy is used for the first rotation member 110. Iron is used for the second rotation member 120.

Since the output pulley 84 rotates along with the output shaft 85, it is desirable to use a material having a small mass for the output pulley 84. On the other hand, given that the lock pin 140 is inserted into the output pulley 84 to lock the rotation of the output shaft 85, it is desirable to use a material having rigidity and high strength for the output pulley 84. According to the above configuration, it is possible to secure required rigidity and strength by using iron for the second rotation member 120 to which the lock pin 140 is inserted and also reduce the entire weight of the output pulley 84 by using an aluminum alloy for the first rotation member 110 around which the transmission belt 83 is wrapped.

What is claimed is:

1. An electric working machine comprising:
an output shaft;
a rotary blade attached to the output shaft;
an output pulley fixed to the output shaft;
an input shaft;
an input pulley fixed to the input shaft;
a transmission belt wrapped around the input pulley and the output pulley;
an electric motor comprising a motor shaft and configured to rotate the motor shaft;
a speed reducer configured to reduce a speed of rotation of the motor shaft and transmit the rotation to the input shaft; and
a housing that houses the electric motor and the speed reducer, and rotatably supports the input shaft and the output shaft,
wherein a rotation axis of the motor shaft is inclined with respect to a direction which is along a rotation axis of the output shaft, and
when the electric working machine is placed on a placement surface, the rotation axis of the output shaft is arranged along a left-right direction in a vicinity of a front end of the housing, and in a side view of the electric working machine, the rotation axis of the motor shaft is inclined at an angle within a range from −45° to 45° with respect to an up-down direction.

2. The electric working machine according claim 1, wherein the rotation axis of the motor shaft is orthogonal to the direction which is along the rotation axis of the output shaft.

3. The electric working machine according claim 1, wherein when the electric working machine is placed on the placement surface,
in the side view of the electric working machine, the rotation axis of the motor shaft is inclined with respect to the up-down direction such that the rotation axis of the motor shaft leans forward as it extends downward.

4. The electric working machine according claim 3, wherein, in the side view of the electric working machine, the rotation axis of the motor shaft is substantially orthogonal to a line passing through the rotation axis of the output shaft and the rotation axis of the input shaft.

5. The electric working machine according claim 1, further comprising:
a first handle disposed on the housing and configured to be grasped by a user with one hand; and
a second handle disposed on the housing and configured to be grasped by the user with the other hand,
wherein when the electric working machine is placed on the placement surface,
the first handle is offset rearwardly from the rotary blade and forwardly from the electric motor, and
the second handle is offset rearwardly from the electric motor.

6. The electric working machine according claim 5, further comprising at least one battery pack configured to be attached to and detached from the housing and supply power to the electric motor.

7. The electric working machine according claim 6, wherein when the electric working machine is placed on the placement surface,
the at least one battery pack is offset rearwardly from the electric motor and forwardly from the second handle.

8. The electric working machine according claim 7, wherein when the electric working machine is placed on the placement surface,
　　in a rear view of the electric working machine, the at least one battery pack and the electric motor at least partially overlap.

9. The electric working machine according claim 7, wherein when the electric working machine is placed on the placement surface,
　　in a rear view of the electric working machine, the rotary blade and the electric motor at least partially overlap.

10. The electric working machine according claim 4, further comprising:
　　a first handle disposed on the housing and configured to be grasped by a user with one hand;
　　a second handle disposed on the housing and configured to be grasped by the user with the other hand; and
　　at least one battery pack configured to be attached to and detached from the housing and supply power to the electric motor,
　　wherein when the electric working machine is placed on the placement surface,
　　the first handle is offset rearwardly from the rotary blade and forwardly from the electric motor,
　　the second handle is offset rearwardly from the electric motor,
　　the at least one battery pack is offset rearwardly from the electric motor and forwardly from the second handle,
　　in a rear view of the electric working machine, the at least one battery pack and the electric motor at least partially overlap, and
　　in the rear view of the electric working machine, the rotary blade and the electric motor at least partially overlap.

\* \* \* \* \*